(12) United States Patent
Chefalas et al.

(10) Patent No.: US 10,318,316 B2
(45) Date of Patent: Jun. 11, 2019

(54) LATE BINDING COMPOSITE SERVICE SPECIFICATION FOR BUSINESS PROCESS EXECUTION LANGUAGE

(71) Applicant: INTERNATIONAL BUSINESS MACHINES CORPORATION, Armonk, NY (US)

(72) Inventors: Thomas E. Chefalas, Somers, NY (US); Andrzej P. Kochut, Croton On Hudson, NY (US); Hui Lei, Scarsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 205 days.

(21) Appl. No.: 14/860,209

(22) Filed: Sep. 21, 2015

(65) Prior Publication Data

US 2017/0083353 A1   Mar. 23, 2017

(51) Int. Cl.
*G06F 8/30* (2018.01)
*G06F 9/445* (2018.01)
*G06Q 10/06* (2012.01)

(52) U.S. Cl.
CPC ............ *G06F 9/44521* (2013.01); *G06F 8/30* (2013.01); *G06F 9/445* (2013.01); *G06Q 10/06* (2013.01)

(58) Field of Classification Search
None
See application file for complete search history.

(56) References Cited

U.S. PATENT DOCUMENTS

| | | | | |
|---|---|---|---|---|
| 2003/0208583 | A1* | 11/2003 | Schroeder | G06F 9/465 709/223 |
| 2005/0086297 | A1* | 4/2005 | Hinks | H04L 67/02 709/203 |
| 2006/0031506 | A1* | 2/2006 | Redgate | H04L 29/06 709/226 |
| 2007/0282814 | A1* | 12/2007 | Gupta | G06F 17/27 |
| 2011/0282707 | A1* | 11/2011 | Rangaswamy | G06Q 10/06 705/7.26 |
| 2012/0029958 | A1* | 2/2012 | Ayed | G06Q 10/06 705/7.11 |
| 2014/0123125 | A1* | 5/2014 | Inamdar | G06F 8/65 717/173 |
| 2015/0052363 | A1* | 2/2015 | Korangy | H04L 9/3247 713/176 |

* cited by examiner

*Primary Examiner* — Chat C Do
*Assistant Examiner* — William C Wood
(74) *Attorney, Agent, or Firm* — F. Chau & Associates, LLC (57) ABSTRACT

A method to generate executables for a business process execution language server includes: defining a process definition that defines a sequence of activities to be performed without specifying computer code used to implement the executables; binding each activity in the sequence to an action within a data type that is representative of a service associated with the corresponding activity; binding each data type to an instance of the corresponding data type that is representative of the service and a provider of the service; and generating the computer code based on the bindings.

20 Claims, 10 Drawing Sheets

ProviderType[ 0 ]
- Abstract
- Name: AbstractService

ProviderTypr[ 1 ]
- Extends ProviderType[0]
- Name: ProvisioningService
- Actions[]: Create, Destroy, PowerOn, PowerOff

ProviderTypr[ 2 ]
- Extends ProviderType[0]
- Name: MonitoringService
- Actions[]: Activate, Deactivate

ProviderTypr[ 3 ]
- Extends ProviderType[0]
- Name: PatchService
- Actions[]: Activate, Deactivate, InstallPatches

ProviderTypr[ 4 ]
- Extends ProviderType[0]
- Name: ComplianceService
- Actions[]: Activate, Deactivate, VerifyCompliance

FIG. 3

ProviderInstance[ 0 ]
- Provider Type: ProvisioningService
- Name: Acme VM Provisioning
- Action[0]
  - Create(input:numCPU,input:memSize,output:instance::virtualmachine,output:instance::operatingsystem)

ProviderInstance[ 1 ]
- Provider Type: MonitoringService
- Name: Eagle Eyes Monitoring Service
- Action[0]
  - Activate(input:input:instance::virtualmachine,output:instance::monitoredVirtualMachine)
- Action[1]
  - Activate(input:input:instance::,output:instance::monitoredOperatingsystem)

ProvideInstance[ ... ]

FIG. 4

ResourceType[ 0 ]
- Abstract
- Name: ComputerSystem
- Attributes:
  - String: ComputerName

ResourceType[ 1 ]
- Extends ComputerSystem
- Name: VirtualMachine
- Attributes:
  - Integer: numVirtualCPU
  - Integer: sizeMemory
  - Integer: sizeDisk

ResourceType[ 2 ]
- Extends ComputerSystem
- Name: BareMetalMachine
- Attributes:
  - Boolean: neverSleep

ResourceType[ 3 ]
- Name: OperatingSystem
- Attributes:
  - String: Name
  - String: Version
- Relationships:
  - Uses: ResourceType[0]

ResourceType[ 4 ]
- Abstract
- Name: MonitoredResource
- Attributes:

ResourceType[ 5 ]
- Extends MonitoredResource
- Name: MonitoredOperatingSystem
- Attributes:
- Relationships:
  - Uses: OperatingSystem

ResourceType[ 6 ]
- Extends MonitoredResource
- Name: MonitoredVirtualMachine
- Attributes:
- Relationships:
  - Uses: VirtualMachine

ResourceType[ ... ]

FIG. 5

ResourceInstance[ 0 ]
- ResourceType: VirtualMachine
- Attribute Values:
  - ComputerSystem.ComputerName = "testcomputer"
  - VirtualMachine.numVirtualCPU = 4
  - VirtualMachine.sizeMemory = 4096MB
  - VirtualMachine.sizeDisk = 20GB

ResourceInstance[ 1 ]
- ResourceType: OperatingSystem
- Attribute Values:
  - Name = "Windows"
  - Version = "8.1 Pro"
- Uses:
  - ResourceInstance[0]

ResourceInstance[ 0 ]
- ResourceType: VirtualMachine
- Attribute Values:
    - ComputerSystem.ComputerName = "testcomputer"
    - VirtualMachine.numVirtualCPU = 4
    - VirtualMachine.sizeMemory = 4096MB
    - VirtualMachine.sizeDisk = 20GB

ResourceInstance[ 4 ]
- ResourceType: MonitoredVirtualMachine
- Attribute Values:
    - virtualMachine = ResourceInstance[0]
    - MonitoredVirtualMachine.EmailAddress = "y@x.com"

LATE BINDING COMPOSITE SERVICE SPECIFICATION FOR BUSINESS PROCESS EXECUTION LANGUAGE

BACKGROUND

1. Technical Field

The present disclosure relates generally to generation of an executable using the Business Process Execution Language (BPEL), and more particularly to generation of an executable for BPEL using a late binding.

2. Discussion of Related Art

BPEL is based on Web Services. Web Services provide a way to communicate over a network in an open and flexible way based on the Extensible Markup Language (XML). BPEL offers an open standard to make a flexible coupling between several systems. As an example, BPEL can be used to automate update of software on remote computer systems. In this example, a local Electronic Resource Planning (ERP) system is used for administration, and a provisioning server is used to install the software on the remote computer systems. However, if the ERP were to control the provisioning server directly, whenever the software of the provisioning server changes, so would the software in the ERP. This means that the software of the ERP would need to be recompiled, which is not desirable. Accordingly, a BPEL orchestration server between the ERP and the provisioning server can be used to connect the ERP to the provisioning server. Then, when the ERP wants to update the software of the remote system, the ERP makes a call to the BPEL server identifying the software to load and the remote system to update. The invokable actions of the provisioning server are available as Web Services, and since BPEL is based on Web Services, the BPEL orchestration server is able to call the provisioning server to load the software onto the identified remote system.

Current BPEL orchestration engines allow a process engineer to author process definitions that represented a sequence of activities. For example, one of the activities in the sequence could be to check on the status of one of the remote systems, and a second one of the activities of the sequence could be to load the software on the remote system upon receipt of the status being set to ready. Each activity must have an underlying implementation (e.g., a code section of XML) that is hard coded at the authoring stage. However, since the underlying code section for each activity is hard coded, it cannot be easily reused.

BRIEF SUMMARY

According to an exemplary embodiment of the invention, a method is provided to generate executables for a business process execution language server. The method includes: defining a process definition that defines a sequence of activities to be performed without specifying computer code used to implement the executables; binding each activity in the sequence to an action within a data type that is representative of a service associated with the corresponding activity; binding each data type to an instance of the corresponding data type that is representative of the service and a provider of the service; and generating the computer code based on the bindings.

According to an exemplary embodiment of the invention, a computer system is configured to generate executables for a business process execution language server. The system includes: a memory storing a computer program; and a processor configured to execute the computer program. The computer program is configured: to define a process definition that defines a sequence of activities to be performed without specifying computer code used to implement the executables; bind each activity in the sequence to an action within a data type that is representative of a service associated with the corresponding activity; bind each data type to an instance of the corresponding data type that is representative of the service and a provider of the service; and generate the computer code based on the bindings.

According to an exemplary embodiment of the invention, a computer program product is provided to generate executables for a business process execution language server. The computer program product includes a computer readable storage medium having program instructions embodied therewith, the program instructions executable by a computer to perform a method including: defining a process definition that defines a sequence of activities to be performed without specifying computer code used to implement the executables; binding each activity in the sequence to an action within a data type that is representative of a service associated with the corresponding activity; binding each data type to an instance of the corresponding data type that is representative of the service and a provider of the service; and generating the computer code based on the bindings.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

Embodiments of the present invention relate to methods and/or systems that break away from the requirement for hard coding an underlying implementation of an activity. Instead a highly reusable and flexible process definition is generated. In an exemplary embodiment, the process definition is embodied by XML code.

The process definition represents a sequence of activities (e.g., functions) that are wired together to form a reusable process definition that is independent of providers that fulfill the activity.

Figure 1:
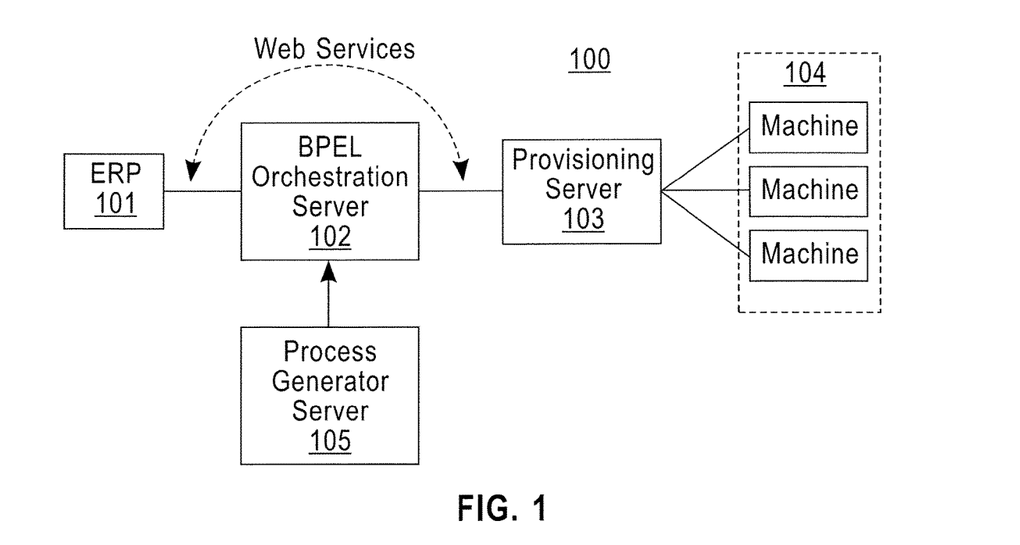
FIG. 1 illustrates a system according to an exemplary embodiment of the invention.

Examples of the activities include a provisioning service, a monitoring service, a patch service, a compliance service, a virtual machine service, data storage service. The provisioning service may be provided by the Provisioning Server 103. Examples of the provisioning service include network, server, user, self-service, mobile subscriber, mobile content, and Internet access provisioning. Examples of the monitoring service include website monitoring, network monitoring, cloud monitoring, server monitoring, and application monitoring. The patch service can be used automate deliver of software patches to remote computer systems. The compliance services can be used to determine whether software on a computer system is in compliance with various rules and regulations. The companies that provide these services are examples of the providers.

The code written to interact with one provider of a provisioning service is different from the code written to interface with a different provider of another provisioning service. For example, providers may expect to receive calls with different parameters, different sets of data fields, data fields with different names, etc. The process definition allows a user to be oblivious to these differences.

FIG. 1 illustrates a system that makes use of a process generator server for a BPEL Orchestration Server, according to an exemplary embodiment of the invention. Referring to FIG. 1, the system 100 includes an ERP 101, the BPEL Server 102, a Provisioning Server 103, remote machines 104, and the process generator. The ERP 101, the BPEL server 102, the provisioning server 103, the machines 104, and the process generator include the necessary hardware (e.g., a network card) to communicate with one another across a computer network such as the Internet. The system 100 is provided as an example to aid in explaining the inventive concept. However, the inventive concept is not limited to this specific system.

Figure 2:
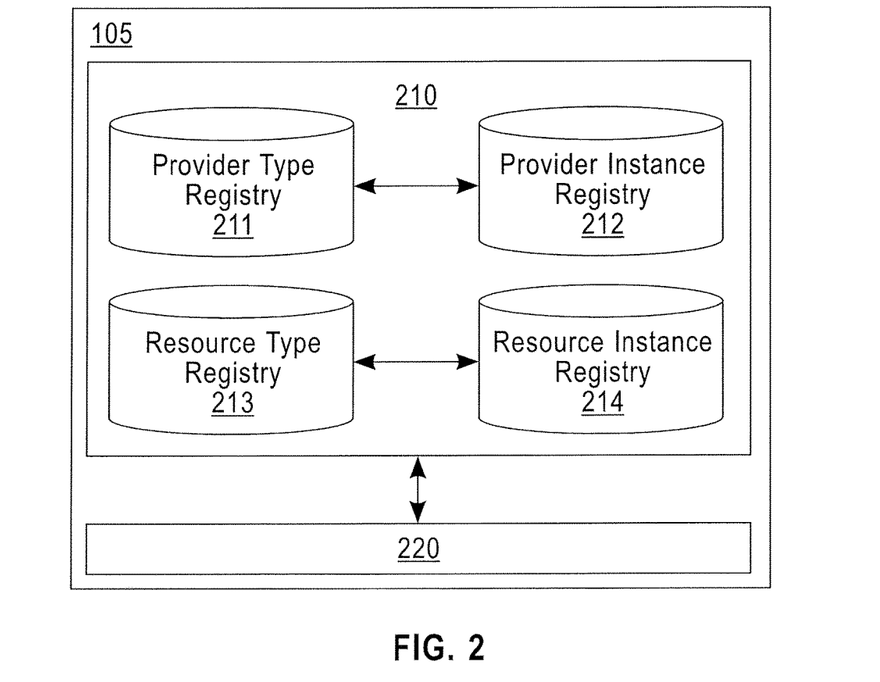
FIG. 2 illustrates a server of the system according to an exemplary embodiment of the invention.

FIG. 2 illustrates the process generator server 105 according to an exemplary embodiment of the inventive concept. The process generator server 105 is used to generate BPEL executables to upload to the BPEL Server 101. Referring to FIG. 2, the process generator server 102 includes a memory 210 storing a provider type registry 211, a provider instance registry 212, resource type registry 213, a resource instance registry, and a processor 220 configured to update the registries 211-214.

The provider type registry 211 includes a plurality of provider types. Each provider type includes a data structure and one or more executable actions (functions) that can be applied to the data structure. A provider type can inherit from another provider type. Further, each provider type may indicate its relationship to another provider type. Examples of these relationships include whether the provider type contains another provider type, whether the provider type is contained within another provider type, and whether the provider type depends on another provider type. For example, a provider type depends on another provider type when it needs data from another provider type. When a provider type is instantiated like a data object, it creates an instance of that provider type. The Provider Instance Registry 212 contains a list of the created provider type instances and their properties. Each provider type instance has a unique identifier or name. Each provider type instance has a list of actions that this provider instance can fulfill with input/output parameters for each action. The input/output parameters are based on resources or resource types.

The resource type registry 213 includes a plurality of the resource types. Each resource type includes a data structure and one or more executable actions (functions) that can be applied to the data structure. A resource type can inherit from another resource type. Further, each resource type may indicate its relationship to another resource type. Examples of these relationships include whether the resource type contains another resource type, whether the resource type is contained within another resource type, and whether the resource type depends on another resource type. Each resource type has a unique name and one or more attributes (for example, in case of a computer system resource, a name, a number of CPUs, an amount of memory, an amount of disk space, an operating system name, a software version, etc.). When a resource type is instantiated like a data object, it creates an instance of that resource type in the Resource Instance Registry 214. Each resource type instance has a unique identifier or name, indicates the kind of resource it represents (e.g., virtual machine, operating system), and has one or more attributes (e.g., a name, number of CPUs, amount of memory, amount of disk, operating system name, software version, etc.).

Figure 3:
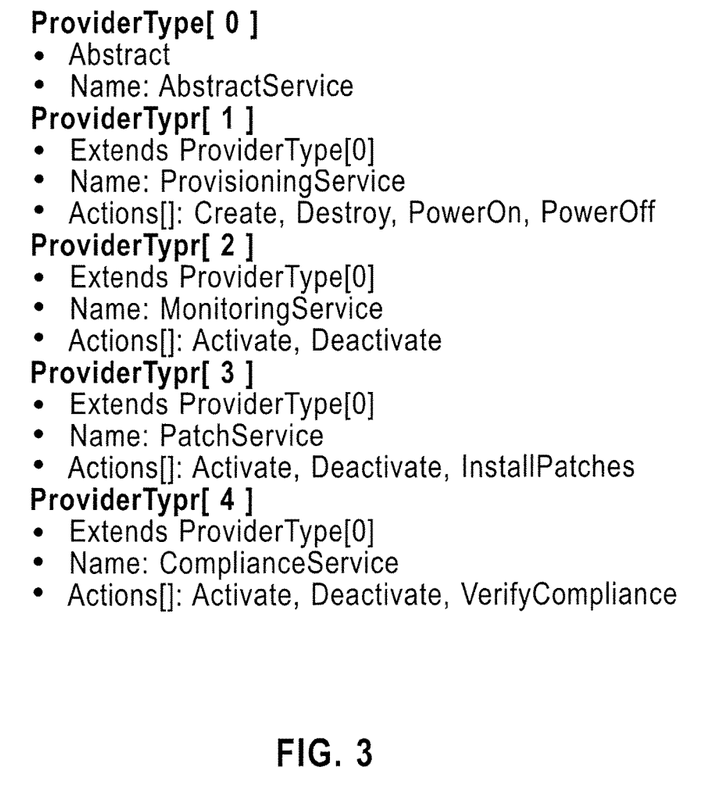
FIG. 3 illustrates examples of provider types according to embodiments of the invention.

FIG. 3 illustrates an example of five of the provider types that may be stored in the provider type registry 211. In this example, the first provider type is labeled as ProviderType[0]. The other three provider types are extensions of the first provider type to show that the other provider types can inherit from the first provider type. Each of the provider types may include one or more actions. The second provider type ProviderType[1] represents a provider of a provisioning service. The third provider type ProviderType[2] represents a provider of a monitoring service. The fourth provider type ProviderType[3] is for a provider of a patch service. The fifth provider type ProviderType[4] represents a provider of a compliance service. In an exemplary embodiment of the inventive concept, the server 105 provides a user with a graphical user interface that enables a user to create or select these provider types.

Figure 4:
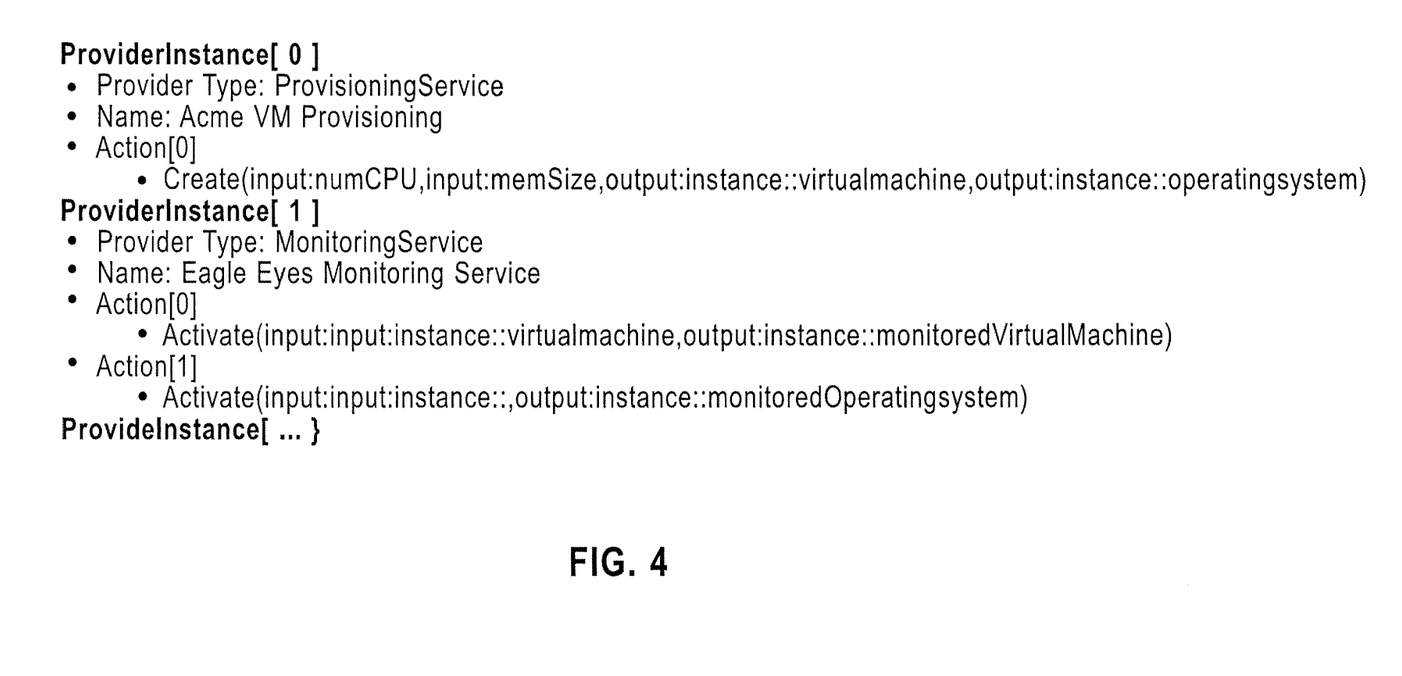
FIG. 4 illustrates examples of instances of the provider types according to embodiments of the invention.

FIG. 4 illustrates an example of two of the provider instances that may be stored in the Provider Instance Registry 212. The first provider type instance ProviderInstance [0] is one instance of the second provider type ProviderType [1] that is representative of a provider of the provisioning service, where the instance has been given the name "Acme VM Provisoning". Additional provider type instances may be created for providers of different provisioning services. The second provider type instance ProviderInstance[1] is one instance of the third provider type ProviderType[2] that is representative of the provider of the monitoring service, where the instance has been given the name "EagleEyes MonitoringService". Additional provider type instances may be created for providers of different monitoring services. The second provider type instance has actions for activating monitoring of a virtual machine and an operating system as an example. The instance may contain additional monitoring actions.

Figure 5:
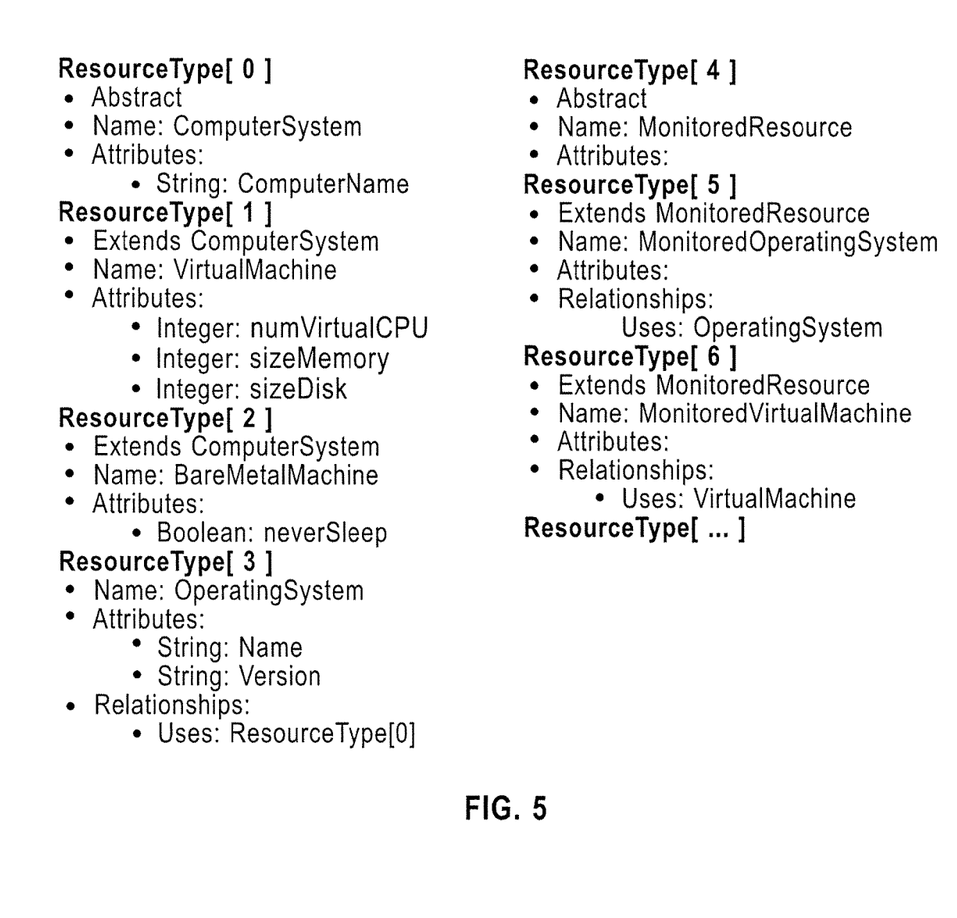
FIG. 5 illustrates examples of resource types according to embodiments of the invention.

FIG. 5 illustrates an example of a data resource model of the system including six resource types that may be stored in the Resource Type Registry 213. The universe of all types and parameters is defined as the data resource model. It is analogous to the web ontology concept for web services, where a specific domain has a vocabulary describing its functions and attributes. In an embodiment of the invention, provisioning of resources is standardized across providers (i.e., a new provider being added to the system adheres to the ontology). So for example, if there are common attributes between two different providers, they will be named the same. In this example, the first resource type is labeled as ResourceType[0] to represent a computer system. The second through third resource types ResourceType[1]-[2] are extensions of the first resource type that inherit from the first resource type. The fourth resource type ResourceType[3] represents an operating system. The fifth resource type ResourceType[4] represents a monitored resource. The six resource type ResourceType[5] is an extension of the fifth resource type to monitor an operating system. The seventh resource type ResourceType[6] is an extension of the fifth resource type to monitor a virtual machine.

Figure 6:
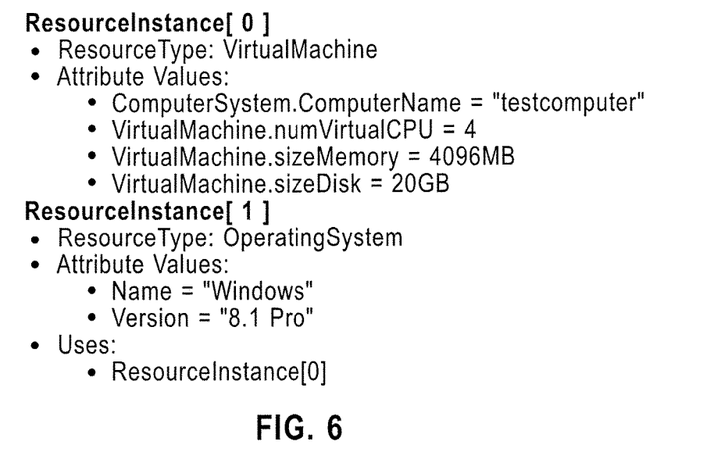
FIG. 6 illustrates examples of instances of the resource types according to embodiments of the invention.

FIG. 6 illustrates an example of two of the resource instances of the resource types that may be stored in the Resource Instance Registry 214. In this example, the first resource instance ResourceInstance[0] is one instance of the second resource type ResourceType[1] to represent a particular virtual machine, and the second resource instance ResourceInstance[1] is one instance of the fourth resource type ResourceType[3] to represent a particular operating system.

FIGS. 7-12 illustrates a method of generating an executable process definition for the BPEL server 102 according to an exemplary embodiment of the invention.

Figure 7:
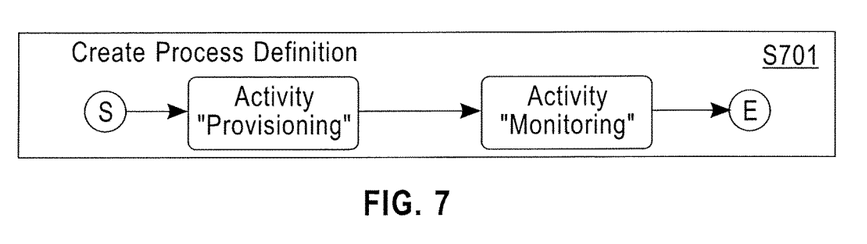
FIGS. 7-12 illustrates a method of generating an executable according to an exemplary embodiment of the invention.

Referring to FIG. 7, the method includes creating a process definition (S701). For example the process definition is created as a sequence of activities that are defined in terms of binding requirements. A user defines a process definition that models the sequence of activities and control flow between activities. Activities do not have an underlying implementation and do not have defined input, output, or private variables defined. In the example shown in FIG. 7, the sequence of activities includes a provisioning activity followed by a monitoring activity. While the sequence only shows two activities, the invention is not limited thereto. For example, the sequence may include less than two activities or more than two activities in various orders in alternate embodiments. Further, the sequence may include different types of activities from that illustrated in FIG. 7, such as a patching activity, a compliance activity, etc.

In an exemplary embodiment, a data structure representative of the activities in the sequence and their order is generated by creating a data item (e.g., a node) for each activity and a pointer to point from a current data item to a next data item in the sequence. For example, the data structure could be linked list or a data tree where each data item is a node in the linked list. For example, a first node representative of the provisioning activity and a second node representative of the monitoring activity may be created, where the first node is linked to the second node.

Figure 8:
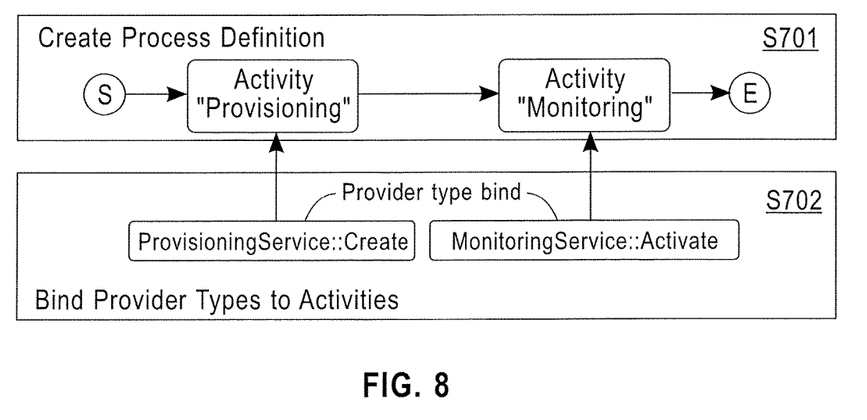

Referring to FIG. 8, the method includes traversing the process definition to generate a provider type binding (S702). The sequence of activities is traversed in the process definition to bind a provider type of the provider type registry 211 to each activity in the sequence. This traversal is performed using an activity bind, which is represented in a machine readable format to reflect what service provider type is used and what action will be performed. For example, the format could be XML or JSON. For example, the nodes in the tree can be traversed in order, where each node (e.g., activity) is bound to one or more actions of a given provider type.

The binding may be represented by using a special sequence of text that is recognizable by an interpreter or a parser (e.g., an XML parser). In an exemplary embodiment, the sequence of text includes a name of the Provider Type (e.g., ProvisioningService, MonitoringService) representative of the activity (e.g., provisioning, monitoring, etc.) within the process definition, a delimiter (e.g., "::"), and a name representative of the action (e.g., "Create", "Activate", etc.). The delimiter enables the interpreter/parser to distinguish between the activity/service and the action. FIG. 8 shows an example of a provisioning activity within a process definition being bound to a create action of a ProvisioningService provider type using the term "ProvisioningService::Create", and example of a monitoring activity of the process definition being bound to an activate action of a MonitoringService provider type using the term "MonitoringService::Activate". The activity bind may be derived from information in the Provider Type Registry 211. FIG. 8 shows an activity being bound to a single action merely for convenience of illustration, as an activity may be bound to several different types of actions in alternate embodiments. In an embodiment of the invention, once a given provider is bound, all of its actions for this step are being utilized and no other provider can be used for the same step.

Figure 9:
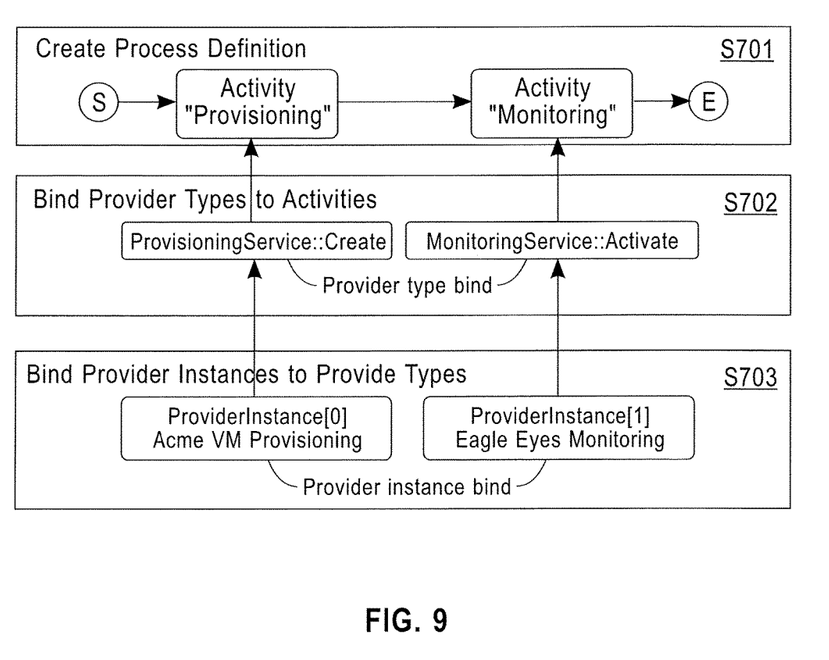

Referring to FIG. 9, the method includes traversing the process definition to generate a provider instance binding (S703). This involves traversing the sequence of activities in the process definition to bind a provider instance from the provider instance registry 212 to each provider type bind. The list of available provider instances from the provider instance registry 212 is filtered to match the provider type. For example, if the process definition only includes the ProvisioningService and Monitoring Service, provider instances for Compliance would be filtered out. For example, a graphical user interface (GUI) can be presented to the user based on the process definition that lists the available provider for each bound provider type. For example, when the ProvisioningService provider type is present in the process definition, the GUI could present selectable choices such as "Acme VM Provisioning", "Company2 VM Provisioning", "Company3 VM Provisioning", where selection of the "Acme VM Provisioning would result in the instance binding shown in FIG. 9. Additionally filtering can be performed based on requirements from prior provider instances. Examples of the requirements include cost of the service or quality of the provided service. An activity bind is represented in a machine readable format (e.g., XML, JSON, etc) to reflect what provider instance is used to fulfill the activity. For example, a data structure may be generated that identifies one of the provider type binds (e.g., ProvisioningService::Create) corresponding to the process definition and a provider instance (e.g., Acme VM Provisioning) that links to the provider type bind. A provider instance "bind" is derived from information in the Provider Instance registry 212.

Figure 10:
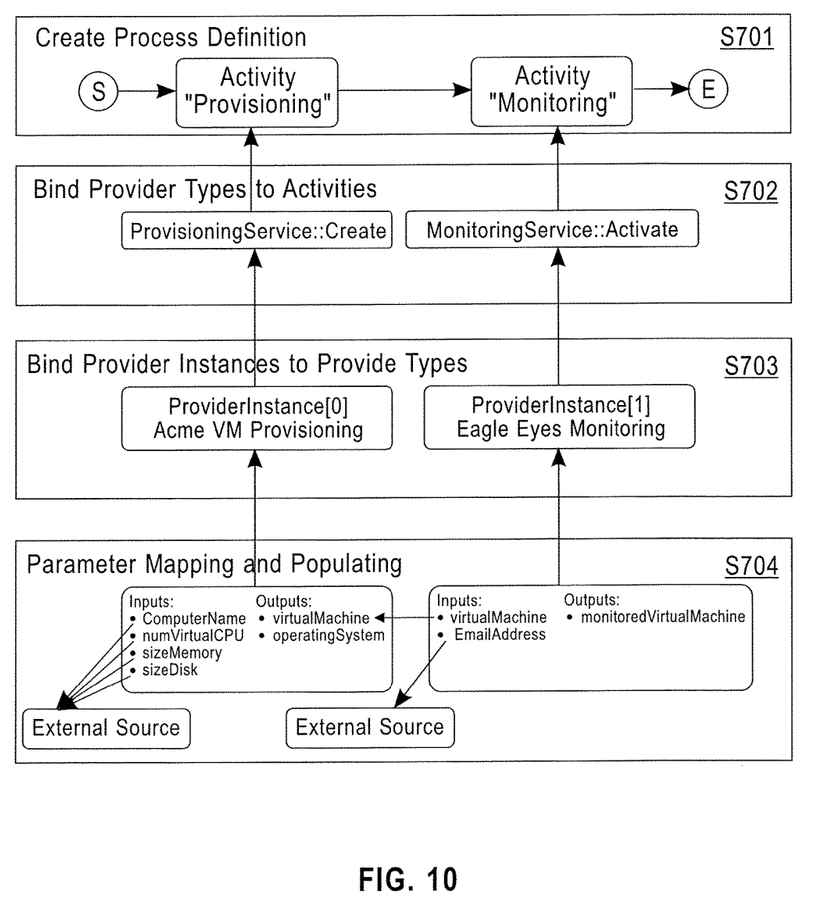

Referring to FIG. 10, the method includes generating a parameter mapping and populating values to parameter mappings that have an external source (S704). The provider instance bind is utilized to map input/output parameters of each activity (action) to an external source. For example, the VM Provisioning service provided by the Acme Company may require various parameters such as the name of the computer requesting the service, the number of virtual CPUs being requested. The parameters required by the service are mapped to input parameters of the provider instance. For example, when the Create Action of Acme VM Provisioning service is called, the user invokes the Create Action by setting the first parameter to a number of CPUs and setting the second parameter to a size of memory, and thus the interpreter, upon encountering each input parameter maps each input parameter to the corresponding input parameter required by the source service. For example, while the ProviderInstance may refer to the number of CPUs as "numCPU"), Acme could refer to a number of CPUs as "CPUnum", while Company2 refers to number of CPUs as "ProcessorNum", etc. The populating is performed by traversing the process definition and populating values for the parameter mappings that have an external source. The population method could be via dialog with end user or integration with an external system. For example, if during the mapping process some parameters are still not bound, their values have to be taken from a user or an external process. The external process can refer to another system calling an API of our process and providing parameters. User may also use a UI to enter parameters needed. Then the process is ready to run and can be scheduled to run now or at some scheduled time.

An input in the parameter mapping of the ProviderInstance[1] points to an output in the provider mapping of ProviderInstance [0] because the value of the parameter is not provided externally but is simply a result of one of the previous activities. For example, monitoring service provider will use a virtual machine object that was created by the provisioning provider. So, for example, the IP address of the virtual machine that should be monitored is not entered by the user but from GUI but, instead, taken from the output of the virtual machine creation step.

Figure 11:
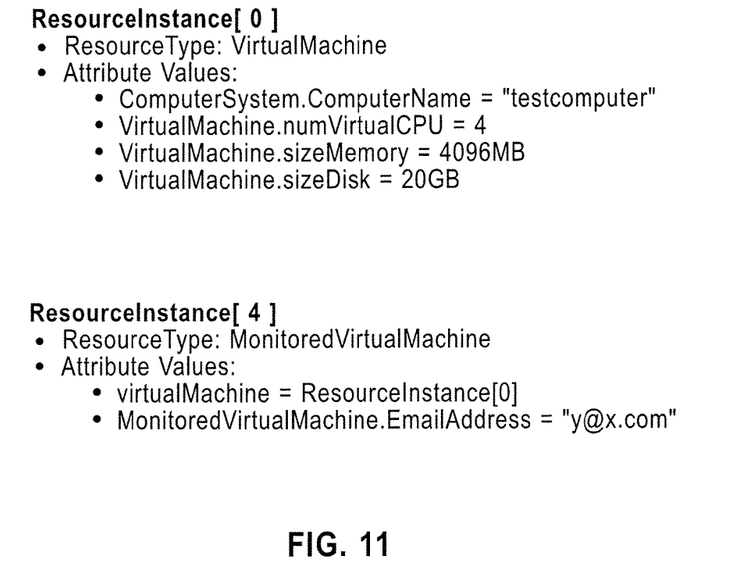

An example of the populating of the values is shown in FIG. 11. For example, in FIG. 11, a first resource instance ResourceInstance[0] is generated from the virtual machine resource type to represent the virtual machine output of the instance of the ProvisioningService Provider type, and a fifth resource instance ResourceInstance[4] is generated from the monitored virtual machine resource type to represent the monitored VirtualMachine output of the instance of the MonitoringService Provider type. For example, the fifth resource instance is set to monitor the virtual machine represented by the first resource instance ResourceInstance [0] by setting a parameter (e.g., virtualMachine) of the fifth resource instance to identify the first resource instance ResourceInstance[0].

Figure 12:
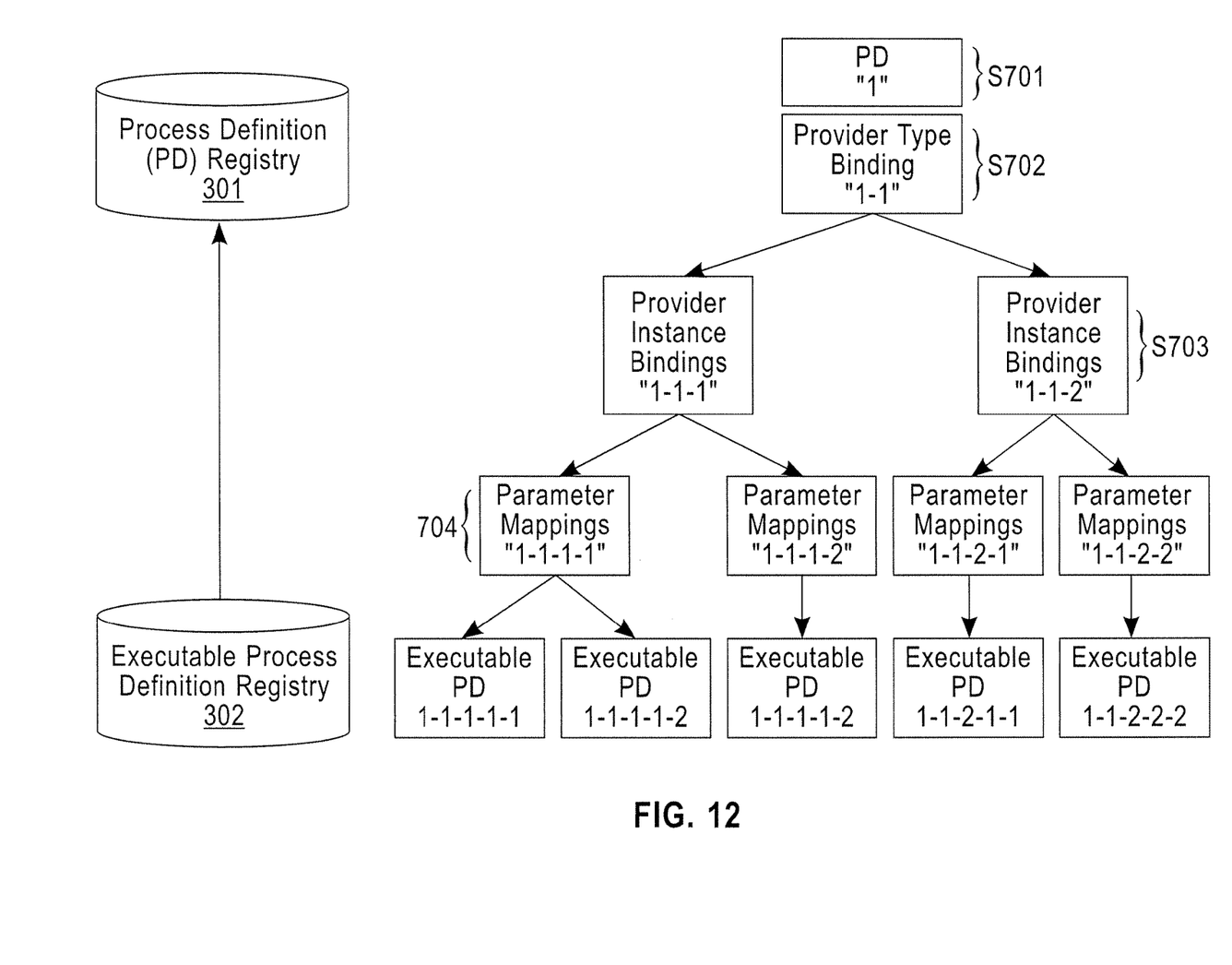

FIG. 12 is an illustration of the results of performing the previous steps. The process definitions may be stored in a process definition registry 301. As shown in FIG. 12, a process definition "1" is binded to a provider type (S701), first and second provider instances ("1-1-1" and "1-1-2") are bound to the provider type ("1-1") (S703), parameter mappings ("1-1-1-1" and "1-1-1-2") are created and populated for the first provider instance and parameter mappings ("1-1-2-1" and "1-1-2-2") are created and populated for the second provider instance (S704). The results can then be used to generate executable process definitions (e.g., "1-1-1-1-1", "1-1-1-1-2", "1-1-1-1-2", and "1-1-2-2-2") for storage in the executable process definition registry 302.

Figure 13:
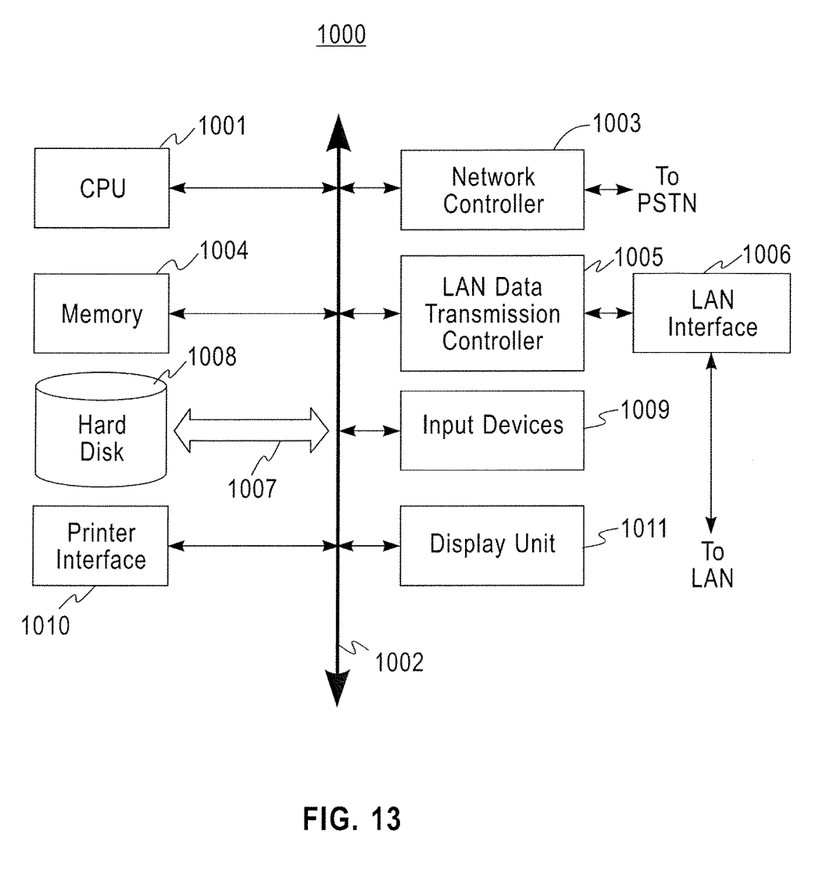
FIG. 13 illustrates an example of a computer system capable of implementing methods and systems according to embodiments of the disclosure.

FIG. 13 illustrates an example of a computer system, which may be used to implement any one of the devices or servers shown in FIG. 1, or execute any of the above-described methods, according to exemplary embodiments of the invention. For example, the method of FIGS. 7-12 may be implemented in the form of a software application running on the computer system. Further, portions of the methods may be executed on one such computer system, while the other portions are executed on one or more other such computer systems. Examples of the computer system include a mainframe, personal computer (PC), a handheld computer, a server, etc. The software application may be stored on a computer readable media (such as hard disk drive memory 1008) locally accessible by the computer system and accessible via a hard wired or wireless connection to a satellite or a network, for example, a local area network, or the Internet, etc.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008 (e.g., a digital video recorder), via a link 1007. CPU 1001 may be the computer processor that performs the above described methods.

Referring to FIGS. 1-12, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing a process generator server to support a business process execution language (BPEL) orchestration server, the method comprising:
    presenting, by the process generator server, a user interface to enable a user to create a process definition that models a sequence of activities to be performed and a control flow between the activities, where the process definition models the sequence using a plurality of data nodes, where each data node represents a corresponding one of the activities, where a first one of the data nodes points to a second one of the data nodes to indicate that the activity of the first data node is to be executed before the second data node, where the activities do not have a hard coded underlying implementation and do not have defined input variables, output variables, and private variables;
    binding, by the process generator server, each activity in the sequence to an action within a data type that is representative of a service associated with the corresponding activity, where the binding of the activity of the first data node comprises generating a data structure linked to the first data node that includes first text representing the service and second text representing the action;
    binding, by the processor generator server, each data type to an instance of the corresponding data type that is representative of the service and a provider of the service;
    generating, by the processor generator server, a BPEL executable based on the process definition and the bindings; and
    uploading, by the process generator server, the BPEL executable to the BPEL orchestration server,
    wherein each instance is listed in a registry stored in the processor generator server, has a unique identifier, has a list of actions fulfillable by the corresponding instance, and parameters for the corresponding listed actions.

2. The method of claim 1, wherein generating the BPEL executable comprises:
    for each instance,
        mapping the parameters of the corresponding listed actions of the corresponding instance to parameters required by the corresponding provider;
        populating the parameters with values in a range supported by the corresponding provider; and
        generating an executable for each instance compatible with the corresponding provider based on the mapping and the populated values.

3. The method of claim 1, wherein the BPEL executable is written in an extensible markup language (XML).

4. The method of claim 1, wherein the process definition specifies at least one of a provisioning a service, a monitoring service, a patching service, a virtual machine service and a compliance service, and the order in which these services are to be performed.

5. The method of claim 1, wherein the data type identifies one of the services and at least one executable action.

6. The method of claim 5, wherein the instance corresponding to the data type specifies a variable input parameter that is an instance of a data type representative of a certain computer resource required by the executable corresponding to the instance.

7. The method of claim 1, wherein the activity of one of the data nodes is a patching activity to deliver a software patch to a remote computer system.

8. A process generator server configured to support a business process execution language (BPEL) orchestration server, the process generator server comprising;
   a memory storing a computer program; and
   a processor configured to execute the computer program,
   wherein the computer program is configured; to present a user interface to enable a user to create a process definition that models a sequence of activities to be performed and a control flow between the activities; bind each activity in the sequence to an action within a data type that is representative of a service associated with the corresponding activity;
   bind each data type to an instance of the corresponding data type that is representative of the service and a provider of the service; generate a BPEL executable based on the process definition and the bindings; and upload the BPEL executable to the BPEL orchestration server,
   where the process definition models the sequence using a plurality of data nodes,
   where each data node represents a corresponding one of the activities, where a first one of the data nodes points to a second one of the data nodes to indicate that the activity of the first data node is to be executed before the second data node,
   where the bind of the activity of the first data node comprises generating a data structure linked to the first data node that includes first text representing the service and second text representing the action, and
   where the activities do not have a hard coded underlying implementation and do not have defined input variables, output variables, and private variables,
   wherein each instance is listed in a registry stored in the processor generator server, has a unique identifier, has a list of actions fulfillable by the corresponding instance, and parameters for the corresponding listed actions.

9. The computer system of claim 8, wherein the computer program generates the BPEL executable for each instance by:
   mapping the parameters of the corresponding listed actions of the corresponding instance to parameters required by the corresponding provider;
   populating the parameters with values in a range supported by the corresponding provider; and
   generating an executable for each instance compatible with the corresponding provider based on the mapping and the populated values.

10. The computer system of claim 9, wherein the BPEL executable is written in an extensible markup language (XML).

11. The computer system of claim 9, wherein the process definition specifies at least one of a provisioning service, a monitoring service, a patching service, a virtual machine service, and a compliance service, and the order in which these services are to be performed.

12. The system of claim 8, wherein the data type identifies one of the services and at least one executable action.

13. The system of claim 12, wherein the instance corresponding to the data type specifies a variable input parameter, wherein the input parameter is an instance of a data type representative of a certain computer resource required by the executable corresponding to the instance.

14. The system of claim 8, wherein the activity of one of the data nodes is a patching activity to deliver a software patch to a remote computer system.

15. A computer program product for managing a process generator server to support a business process execution. language (BPEL) server, the computer program product comprising a computer readable storage medium having program instructions embodied therewith, the program instructions executable by the process generator server to perform a method comprising:
   presenting a user interface to enable a user to create a process definition that models a sequence of activities to be performed and a control flow between the activities, where the process definition models the sequence using a plurality of data nodes, where each data node represents a corresponding one of the activities, where a first one of the data nodes points to a second one of the data nodes to indicate that the activity of the first data node is to be executed before the second data node, where the activities do not have a hard coded underlying implementation and do not have defined input variables, output variables, and private variables;
   binding each activity in the sequence to an action within a data type that is representative of a service associated with the corresponding activity, where the binding of the activity of the first data node comprises generating a data structure linked to the first data node that includes first text representing the service and second text representing the action;
   binding each data type to an instance of the corresponding data type that is representative of the service and a provider of the service;
   generating a BPEL executable based on the process definition and the bindings; and
   uploading the BPEL executable to the BPEL orchestration server,
   wherein each instance is listed in a registry stored in the processor generator server, has a unique identifier, has a list of actions fulfillable by the corresponding instance, and parameters for the corresponding listed actions.

16. The computer program product of claim 15, wherein generating the BPEL executable comprises:
   for each instance,
      mapping the parameters of the corresponding listed actions of the corresponding instance to parameters required by the corresponding provider;
      populating the parameters with values in a range supported b the corresponding provider; and
      generating an executable for each instance compatible with the corresponding provider based on the mapping and the populated values.

17. The computer program product of claim 15, wherein the BPEL executable is written in an extensible markup language (XML).

18. The computer program product of claim 15 wherein the activity of one of the data nodes is a patching activity to deliver a software patch to a remote computer system.

19. The computer program product of claim 15, wherein the data type identifies one of the services and at least one executable action.

20. The computer program product of claim 19, wherein the instance corresponding to the data type specifies a variable input parameter, and the input parameter is an instance of a data type representative of a certain computer resource required by the executable corresponding to the instance.

* * * * *